US012601143B1

(12) United States Patent
Roden et al.

(10) Patent No.: US 12,601,143 B1
(45) Date of Patent: Apr. 14, 2026

(54) SKID-STEER ARM DEVICE AND SYSTEM

(71) Applicants: Thomas V. Roden, Port Washington, WI (US); Aaron T. Roden, Port Washington, WI (US)

(72) Inventors: Thomas V. Roden, Port Washington, WI (US); Aaron T. Roden, Port Washington, WI (US)

( * ) Notice: Subject to any disclaimer, the term of this patent is extended or adjusted under 35 U.S.C. 154(b) by 335 days.

(21) Appl. No.: 18/225,394

(22) Filed: Jul. 24, 2023

Related U.S. Application Data

(60) Provisional application No. 63/401,892, filed on Aug. 29, 2022.

(51) Int. Cl.
| | |
|---|---|
| *E02F 3/34* | (2006.01) |
| *B62D 33/06* | (2006.01) |
| *B62D 37/04* | (2006.01) |
| *E02F 9/16* | (2006.01) |
| *E02F 9/18* | (2006.01) |

(52) U.S. Cl.
CPC .............. *E02F 9/163* (2013.01); *B62D 33/06* (2013.01); *B62D 37/04* (2013.01); *E02F 3/3414* (2013.01); *E02F 9/18* (2013.01)

(58) Field of Classification Search
None
See application file for complete search history.

(56) References Cited

U.S. PATENT DOCUMENTS

| | | | | |
|---|---|---|---|---|
| 1,655,771 | A | * | 1/1928 | Nichol ................... A01D 90/02 |
| | | | | 414/442 |
| 8,007,222 | B1 | * | 8/2011 | Roden ..................... B66C 23/72 |
| | | | | 414/719 |
| 8,807,910 | B1 | * | 8/2014 | Roden ...................... E02F 9/18 |
| | | | | 414/673 |
| 8,827,625 | B2 | * | 9/2014 | Biggerstaff ........... E02F 3/3411 |
| | | | | 414/718 |
| 9,689,144 | B2 | * | 6/2017 | Roden ..................... B66C 23/72 |

OTHER PUBLICATIONS

JP2522345B2 by Nagata, "Skid Steerer", Aug. 7, 1996, all figures and pages. (Year: 1996).*

* cited by examiner

*Primary Examiner* — Michael S Lowe
(74) *Attorney, Agent, or Firm* — Mandy L. Tran, Esq.; CERES Patent & Technology, LLC

(57) ABSTRACT

The invention disclosed herein pertains to one or more rotatable arm elements that are attached to a skid-steer vehicle. Said skid-steer vehicle comprises a material loading and transfer device that requires one or more arms for lifting heavy material. Each of said arm elements comprises a Z-shaped feature that does not obstruct the doorway opening of said skid-steer vehicle when it is in a lowered and at rest position. When each of said arm elements is in a raised in-use position, they each obstruct the doorway opening of said skid-steer vehicle. The length of each said arm element is extendable and retractable when in-use. A variable counterweight device is attached to the bottom of said skid-steer vehicle for added rearward counterweight when each said arm element is in-use.

4 Claims, 2 Drawing Sheets

SKID-STEER ARM DEVICE AND SYSTEM

CROSS REFERENCE TO RELATED APPLICATIONS

This is a nonprovisional patent application claiming priority benefit of U.S. Provisional Patent Application No. 63/401,892 filed on Aug. 26, 2022, in accordance with 35 U.S.C. 119 (e). Provisional patent application No. 63/401,892 is hereby incorporated by reference in its entirety.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND OF THE INVENTION

Field of the Invention

The present inventive subject matter relates to a pivoting arm element for a skid-steer device, specifically to improve vehicle counterweighting and the safety of a user's ingress and egress from the skid-steer device.

Background

The typical skid-steer vehicle has seen little change to its fundamental design. The typical design of a skid-steer vehicle contains severe safety risks. A study published in 2022 indicated a total of 312 skid-steer related injuries between the years 2015-2020 due to the manner in which users operated the vehicles. Gorucu, Serap, Bryan Weichelt, and Richard Burke. 2022. "Injuries and Fatalities Related to Skid Steers: 2015-2020" *Safety* 8, no. 3:56. https://doi.org/10.3390/safety8030056. This study further reported a finding by the U.S. D.O.L. of 100 incidents between 1997 and 2007 with 20% of those injuries and fatalities directly resulting from the operator bypassing the built-in safety features available in the skid steer. Unfortunately, the added safety features fail to improve on the level of safety of the typical skid-steer vehicle design because of certain inherent flaws in how it operates fundamentally.

There are a variety of risks inherent to a skid-steer vehicle. They are inherent to its basic design. Recognizing these flaws require an introduction to its basic features. The standard design of a skid-steer vehicle comprises a central cab feature positioned above the chassis body with two rotatable arms connected to a pivoting point rearward of said cab feature. The cab feature of a skid-steer vehicle contains a centrally positioned seat for use by the operator. The seat is centrally positioned within the cab. The cab is centrally positioned above and near the front side of the skid-steer device. Underneath the cab feature is the bottom frame of the vehicle. Along the bottom side of the bottom frame of the vehicle is the vehicle chassis which is connected either to wheels or roller tracks. Along the rearward side of the vehicle is the hydraulic mechanism that attaches to a linear arm on both the right and left sides of said vehicle. The rearward portion of the vehicle body is heavier than its front portion. The heavier rearward portion helps to counterweigh the weight of material carried by the arms on the front end of the vehicle. Given the precarious nature of moving weights on the front end of the vehicle, the arms are limited to the distance it may extend beyond the front end of the vehicle and how much weight it may carry. The typical skid-steer vehicle design is a simple box-like shape and operates to move heavy material between a forward and upward motion and a downward rearward motion. This motion creates a pendulum effect on the weight distribution of the vehicle, with the potential of creating an unsafe level of instability when in use. Machines may easily tip to its side if operated over uneven terrain or if the arms move at an inappropriate speed.

Another design flaw of a typical skid-steer vehicle relates to the location of the arms relative to the doorway of the cab feature. As described above, the shifting of a heavy weight between the front and rear sides of the vehicle device requires the arms to be shorter in order to maintain stability. The shorter arms are designed with a bend such that when in an at rest-state, it is already in a partially elevated position. This gives the arms a height and reach advantage when it is lifted or rotated forward.

The angled design of the arms in their at-rest position will have them partially cover the side entrance doors of the vehicle cab, obstructing ingress and egress for the user when the vehicle is not in use. The obstruction may cause the user to by-pass safety features by attempting to exit the cab while the arms are in their lifted position, offering more space for movement. In many such instances, the operator may accidentally trigger a release of the arm, causing the arm to fall onto the user mid-way out of the cab, resulting in fatal injury. Alternatively, the operator may be precariously positioned if they attempt to turn the vehicle off and lower the arms after they have exited the cab. In this case, the user is still likely located too close to the arms while they are being lowered. This creates a dangerous scenario.

Several prior inventions have disclosed improvements to the arm features but these improvements fail to adequately solve the risk factors herein mentioned. Chinese Patent No. CN112227437A provides a skid-steer arm that is curved downward and forward in linear manner. The proximal end of this arm is connected in a pivoting way to a location rearward and above the cab. The arm is pushed forward in a similar manner by a hydraulic extension underneath the curved portion of the arm. However, the arm is still positioned above the bottom of the cab floor and remains in the way of ingress and egress access when in a resting position.

U.S. Pat. Nos. 8,382,191B2, 3,739,527A, and 6,427,383B1 each provide a unique device and method for safely removing a window in a quick abrupt manner during an emergency situation to enable safe egress from a contained environment. However, none of these devices address safety hazards unique to skid-steer devices.

There remains a need in the industry to improve and expand on the operational features of the traditional skid-steer device while also improving its safety and stability. Specifically, it would be ideal for a skid-steer device to have a farther extendable arm reach, improved stability when in operation, and improved ergonomic design for safe and ease in the ingress and egress from the cab element.

SUMMARY OF THE INVENTION

The invention herein comprises a device and system for an improved skid-steer vehicle and arm feature. Specifically, the device comprises an improved skid-steer vehicle with a Z-shaped arm attachment. Each of said Z-shaped arms are positioned along both left and right sides of said skid-steer vehicle. At rest, the Z-shaped arms are in a lowered position where their each greater length are located below the floor level of the cab feature, parallel and horizontally along the side of said skid-steer vehicle. At rest, the Z-shaped arm would be positioned along the side of said skid-steer vehicle in such a way that it would not obstruct the entry space into and out of the cab feature doorway and the user would have full access to the doorway space of said cab, stepping onto and or over said Z-shaped arm. When the Z-shaped arm is in use, a portion of the arm crosses over the doorway of said cab feature, blocking access for egress or ingress into the cab. The user is required to turn the skid-steer vehicle off and lower the Z-shaped arms in order to regain access for either egress or ingress to and from the cab. In the case of an emergency during the operation of the vehicle and with the arms in a lifted position, emergency exit windows may be available within the cab feature where the user may safely and quickly exit without turning off the vehicle by either kicking, breaking, knocking, or unlatching said windows for exiting.

Another feature of this invention provides for an easily adjustable or liftable seat element. The seat element may be raised by a curved C-track that allows the internal cab space to be expanded for easier movement when entering or exiting the cab. This helps to prevent unintended contact with functional controls within the cab.

The arm elements of this device are further extendable. The extended weight at the front end of said device is counter-weighed by the higher position of the Z-shaped arm at the rear end of said skid-steer vehicle. For improved stability, an adjustable counter-weight system is positioned along the bottom perimeter surface near or adjacent to the vehicle chassis to provide adequate counterweight and center of gravity control.

According to one embodiment of the invention described herein, said skid-steer vehicle arm device comprising a skid-steer vehicle having a front side and a rear side. The skid-steer vehicle further has a right side and a left side and a top and bottom side. A cab feature is located at the top front end of said skid-steer vehicle. The cab feature has at least a front window and optionally also a rear window. Ideally either or both front and rear windows has minimal or no obstructions in front or outside of it (the space outside of the internal space of the cab feature) such that an adult human may exit through either of said windows to the outside space safely and with ease. The cab feature also has at least one doorway access on either of its left or right sides or both left and right sides for user ingress and egress. The cab feature provides a floor surface for the user to stand or sit on within said cab feature. The floor surface of said cab feature is positioned horizontally parallel to and above the ground surface. The floor level of the skid-steer vehicle is along the same horizontal plane in which the floor surface is located along said skid-steer vehicle. The skid-steer vehicle further comprising an arm unit. The arm unit has a first individual arm attached to the left side and a second individual arm attached to the right side of said skid-steer vehicle, each individual arm of said arm unit having a Z-shape. Each individual arm of said arm unit has a first terminal end and a second terminal end. The second terminal end of each individual arm of said arm unit is located above the first terminal end. The second terminal end of each individual arm of said arm unit is rotatably connected to the rear side of said right and left side of said skid-steer vehicle. Each individual arm of the arm unit positioned along the right and left sides of the skid-steer vehicle without obstructing the doorway access of the cab feature. Each individual arm of the arm unit is positioned along the right and left sides of the skid-steer vehicle in a manner that obstructs the doorway access of said cab feature when in an elevated position.

In order to facilitate an understanding of this invention, the preferred embodiments of the invention are illustrated in the drawings, and a detailed description thereof follows. Other features, advantages, and object of the present invention will become more apparent and be more readily understood from the following detailed description, which should be read in conjunction with the accompanying drawings. It is not intended, however, that the invention be limited to the particular embodiments described or illustrated herein. Various modifications and alternative embodiments such as would ordinarily occur to one skilled in the art to which the invention relates are also contemplated and included within the scope of the invention described and claimed herein.

DETAILED DESCRIPTION OF THE INVENTION

Reference will now be made in detail to exemplary aspects of the present invention which are illustrated in the accompanying drawings. Wherever possible, the same reference numbers will be used throughout the drawings to refer to the same or like parts.

Figure 1:
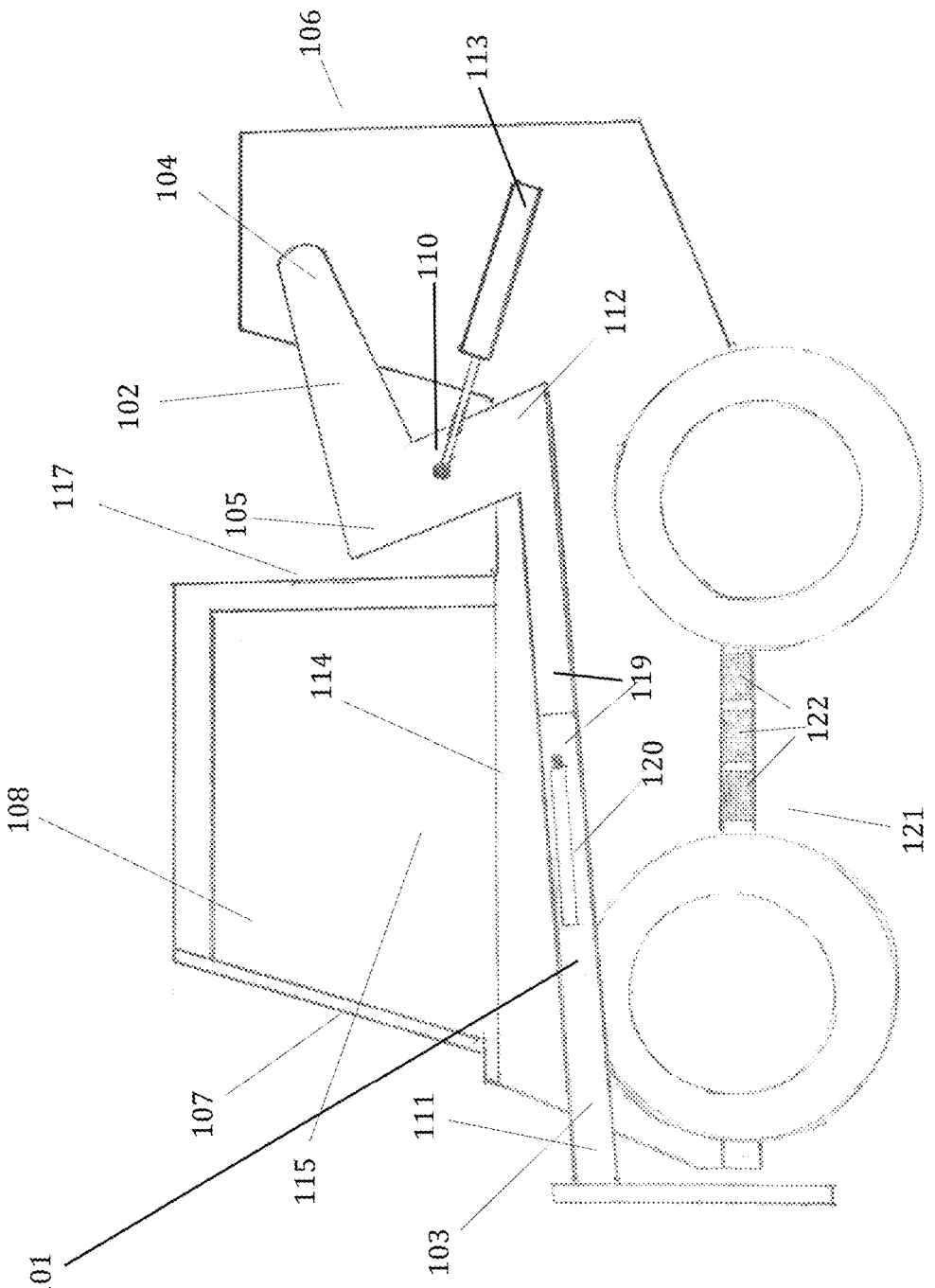
FIG. 1 is a side plan view of a preferred embodiment of the invention as described herein.

According to a preferred embodiment of this invention as shown in FIG. 1, said Z-shaped arm 101 comprising a first and second arm element having a Z-shape. Said Z-shape having an upper horizontal linear piece 102 and a lower horizontal linear piece 103 where said upper 102 and lower 103 horizontal pieces are parallel to each other. Said upper 102 and lower 103 horizontal pieces each having a distal end 104, 112 and a proximal end 105, 111. The distal end 104 being located closest to the rearward side 106 of said skid-steer vehicle. Said rearward side 106 of said skid-steer vehicle being located rearward away from the front window 107 of said cab feature 108. Said distal end of said upper horizontal linear piece of each said arm element is rotatably attached to the external surface of said skid-steer vehicle at its said right and left sides rearward of its said cab feature.

The proximal end 105 of said upper horizontal piece 102 and the distal end of said lower horizontal piece 104 are connected by a linear angular piece 110 wherein said distal end of said lower horizontal piece 104 is positioned beyond the proximal end of said upper horizontal piece 111 in the direction towards the distal end of said upper horizontal piece 112, forming a Z-shaped arm element 101. The connection between said linear angular piece 110 is static between the ends of said upper and lower horizontal pieces.

An extendable linear hydraulic element 113 is attached in a bisecting manner to said linear angular piece 110 on the rearward side of said arm element such that when said extendable linear hydraulic element 113 is extended, said Z-shaped arm is pushed forward in an angular upward direction. A gusset element may be welded onto the angled elbow areas of said Z-shaped arm to provide stronger support.

When said Z-shaped arm is in an at-rest position, said lower horizontal piece 104 is positioned in a parallel manner to a horizontal plane from the ground surface and at or beneath the floor level 114 of said cab feature 108. Said Z-shaped arm should not block the doorway area 115 of said cab feature 108 when it is in an at-rest position. When said Z-shaped arm is in an active and elevated in-use position, it will partially cross over and block the doorway area of said cab feature. By this Z-shaped design, when the two arms are in an elevated in-use position, they each cross the vehicle doorway 115 blocking egress by the user. This will force the user to lower the arms in order to exit the cab. In this case, 100% of egress scenarios will involve the arms being in a lowered position. Said typical skid-steer vehicle may have one side entrance door on its either left or right side. It may alternatively have two side entrance doors on both right and left sides. Said typical skid-steer vehicle may further have visibility along it's right or left sides either through windows attached to doors of their each said doorway or alternatively window panes embedded within a static stationary wall without a door.

Another benefit of said Z-shaped arm is that when it is in the lowered or at-rest position, it is not obstructing the doorway element of said typical skid-steer vehicle. In such case, visibility through the doorway is much wider. When said typical skid-steer vehicle is in use and in operation, the arm may be lifted and crossing over said vehicle doorway. However, when the arms are lowered during operation, the user has full visibility from either side of said typical skid-steer vehicle. This is also the case when said typical skid-steer vehicle is in its at-rest position. This is an improvement over the prior art where the arm features of a typical skid-steer vehicle would be obstructing visibility from either its right or left sides or doorways on its right or left sides.

An emergency front 107 or rear 117 window exit is available in case the vehicle is tipped over. The emergency exit allows the user to kick or push the windows open for safe egress through the front or rear sides of the vehicle where the arms are not in the way.

The seat element may also be raised by a curved C-track and latched in position to move the seat element out of the way and expanded the open area within the cab space for easier movement. This helps to prevent unintended contact with functional controls within the cab.

According to an alternative embodiment of said Z-shaped arm 101, said lower horizontal piece 104 may further comprise two nested linear elements 118 that slidably extend and contract within each other. Said two nested linear elements 119 of said lower horizontal piece 104 is slidably extendable relative to each other by a common connection to a hydraulically powered rod element 120. When said hydraulically powered rod element 120 is activated, the rod element 120 extends outward and forward, causing said two nested linear elements 119 to slidably extend away from each other, resulting in an extended length to the overall length of the lower horizontal piece of said Z-shaped arm. Activation of said hydraulically powered rod element 120 is enabled by electrical power generated from the motor or battery of said skid-steer vehicle and manually operable by said user from the location of said cab element. In its activated state, the hydraulically powered rod element 120 is in an extended position. In its resting state, the hydraulically powered rod element 120 is in a recessed position.

Given that an extension to the length of each Z-shaped arm by manner described above would put much greater weight towards the front of the skid-steer vehicle, it would be necessary to have a means and device for counter-balancing 121 this weight during use. Said counter-balancing means and device 121 would need to be adjustable as each said arm rotates between an elevated and lowered position during use. As the Z-shaped arms 101 are moved forward and above the cab feature 108 of said skid-steer vehicle, counter-weights 122 attached to a counterweight means and device 121 will move rearward at a proportional scale to create a stable and even center of gravity. As the Z-shaped arms 101 are further extended by the hydraulic rod element 120, additional weights may be added to the counterweight means and device 121. The location and speed of movement and stationing of said counterweights along the counterweight means and device 121 may be variable, adjustable, and pre-programmed by a software means to always maintain a controlled center of gravity of the vehicle while the arms are in motion. According to yet another alternative embodiment of this invention, said counter-weight means and device 121 would comprise the following features as will be described.

Figure 2:
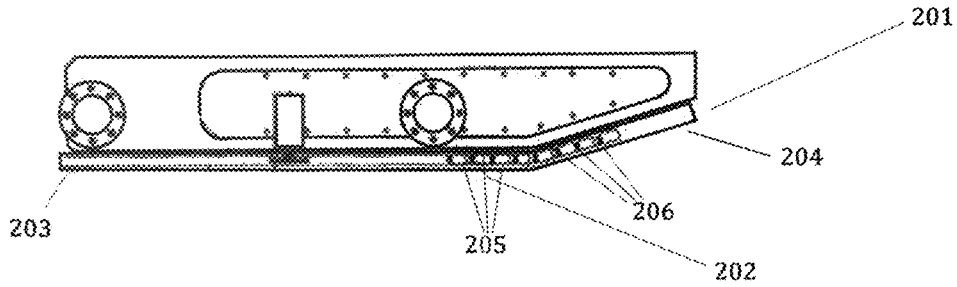
FIG. 2 is a partial side view of a preferred embodiment of the counterweight elements of the invention as described herein.

A single counterweight device and system 121, 123 as shown in FIG. 2 may be attached around one or more sides of a skid-steer vehicle along one or more planar paths and in parallel or intersecting directions. This linear (space-saving) design enables the single counterweight device to be attachable to the bottom of said skid-steer vehicle, improving its center of gravity control during use. Said device and system may be scaled down in size for the ability to finely adjust counterweight load or alternatively scaled up in size to cross-fit smaller vehicles to meet heavier work demands. The device and system of this invention are versatile and adaptable to a diverse variety of machinery designs. The ability to specially tailor the configuration of a system specifically to a desired functionality for a machine or vehicle is incredibly valuable in the industry, allowing users to maximize cross-over functionality of their existing equipment.

A. Elements of Invention

The present invention provides a configurable and variable counterweight system for a material 201 handling machine (that is either stationary or movable in design), specifically a skid-steer vehicle as illustrated within FIGS. 1 and 2, comprising one or more planar paths 202, said planar paths containing any one or combinations of straight, curved or angled portions between at least a first 203 and second end 204, said planar path having transferrable counter-weights 205, said planar path 202 and counterweights 204 communicating (remotely or otherwise) with a control device and system, said control device and system comprising one or more drive unit and optionally one or more sensors, said counterweights 205 being able to move along any curved, angled or straight portions of said planar path. Said drive unit comprising an energy source (i.e. any known energy source such as but not limited to electric, pneumatic, hydraulic, manual power, etc.) and a drive element (i.e. any known drive source such as but not limited to manual lever, rotary axle drive, pressure accumulator, motor pump, etc.). Said counterweights 205 are transferrable along said planar path 202 by way of a transfer element 206 (i.e. any known transfer element that holds and move counterweight in a linear fashion such as but not limited to chain, belt, pipe, tube, rails, valve-chambered system, etc.). Said planar path 202 and transfer element 206 may be one in the same element or two separate elements. Counterweight movement may be controlled (adjusted and distributed) by automatic or manual means. Automatic control means further comprising communication (remotely or otherwise) between one or more sensor elements, said counterweight device, and said material handling machine (i.e. a skid-steer vehicle), or any combinations thereof.

B. Counterweight Matter

The counterweighting material of this invention may be solid, semi-solid or fluid (i.e. liquid, pliable or flowable solid matter) but essentially may be moved along one or more substantially planar paths, in dividable units, said counterweight units 205 transferrable over straight, curved or angled portions or surfaces along said planar path 202 without substantially obstructing its own movement to enable compaction or consolidation of said weights in an organized fashion, such as rolling or folding of solid weights, etc. Flowable, pliable or liquid weights may be more easily transferred through tube or pipe system, contained or compacted within valve-chambers. Said valve-chambered pipe system functioning as both planar path of movement and transfer element and may take on straight, curved or angled shapes. The additional ease of moving fluid matter in free floating manner allows counterweights of this invention to travel through multiple planar paths concurrently by at least a single drive and control mechanism.

The counterweight may be embodied as a plurality of individual solid masses 205 directly attachable to a transfer element or alternatively held within a chamber, said chamber either separately connected to the transfer element 206 or otherwise integrated within said element. This is a practical option when working with softer or brittle matter (i.e. lead) that may break off by its own weight. The counterweights in fluid form may comprise actual liquid (i.e. ferrafluid or Calcium Chloride) or small flowable or pliable solid matter such as beads submersed in viscous material. The advantage of a fluid system allows the transfer of weights to move concurrently in multiple directions with single drive unit.

C. Transfer Element

According to one embodiment of the invention herein, a plurality of individual counterweights 205 in solid form, each individually positioned adjacent to another, held and moved along said planar path 202, whose position individually or as a group are adjustable (movable) by a transfer element 206 to any choice location between the front and rear portions of the material handling machine. Said transfer element 206 of this embodiment is preferably a rotary axle drive by hydraulic power source but may be from any known type of drive device and power source (i.e. electric, pneumatic, manual, or any other known type of power source), method or system that allows said plurality of adjacently positioned counterweights 205 to move in tandem forwards and backwards along the primarily planar path. Said transfer element is preferably a length of chain, wire or belt attached to, sleeved through or containing a plurality of individual counterweights. Alternatively, the element may be links interconnected between counterweight masses that are pivotal at the points of connection.

Said transfer element 206 pulling said counterweights 205 along a given direction as the transfer element 206 winds or unwinds by rotary axle and drive element. Alternatively, a transfer element 206 comprised of rope or wire may be loosely sleeved through each individual counterweight 205 of the plurality of counterweights and permanently affixed to the first and last weight on the chain. Said rope wire may wind or unwind by rotary axle and drive to move the rope wire and weights held thereon in a forward or backward direction. The attached first or last weight being stationary in nature would naturally pull the loosely sleeved counterweights in between along the track like a caboose and carriages on a train.

Each individual counterweight 205 of the plurality of counterweight is preferably positioned freely in an adjacent manner. Freedom of movement between adjacent individual counterweights is necessary to allow pivotal movement over curved or angled portions of the planar path without the obstruction of counterweights against each other's movements. Such freedom of movement further allows the counterweights to wrap over each other at either rotary axle ends. Wrapping of weights may be in a consolidated roll or in a zig-zag folded orientation.

The transfer element 206 with attached counterweights 205 of this solid form counterweight device and system is preferably driven and retained at one or more ends by one or more rotary axles. For maximum concentration of counterweight load, the entirety of counterweights on a given device may be consolidated at the location of the rotary axle. As such, location of the rotary axle will be a strategic consideration when attaching said device to any given material handling machine. The transfer element 206 may alternatively be held and guided within a grooved track or rail that helps to guide direction of movement, particularly when involving loosely configured counterweights. The transfer element need not be limited in its manner of holding said plurality of individual counterweights as long as it is able to transfer a defined number and amount of individual counterweights in adjacent position (and possibly in multiple layers) along a planar axis path.

Therefore, said transfer element may comprise any of the following means, but not necessarily limited to such: a length of belt having adjacent pockets containing individual weights of specific size or volume, a wire loosely sleeved through a plurality of individual weights, a chain pivotally attached to individual counterweights by hook or wire connection, interconnected pivotal links, a valve-chamber system wherein material is transferred by directed pressure. According to above described embodiments, the plurality of counterweights may be moved along one or more planar paths through multiple angles, sides and directions.

D. Weight Per Surface Area

Total amount of weight per surface area unit may further be maximized by this invention by layering method. At a minimum, a first layer of adjacently positioned individual counterweights as described above is provided. A secondary lateral layer(s) of individual counterweights may be attached onto said first or prior layer of counterweights to increase counterweight load per surface area unit. The individual counterweights of the secondary lateral layer(s) should also be positioned in adjacent free manner to minimize interference of movement over curved or angled surfaces. The freedom to pivot and move over uneven surfaces also provide ability to roll together in multiple layers over a rotary axle end or in a folded pattern. Additional secondary lateral layers may be attached in similar manner to increase and maximize total counterweight load per available surface area on a machine. Counterweights may be spaced apart at variable distances on said transfer element to facilitate unique manner of locating and varying the weights on a machine of a given shape and design. Spacing between weights may also allow multiple layers to roll together more effectively. For example, greater space in between individual counterweights in the upper layers will minimize obstruction of weights within and between the layers when they are cumulatively rolled together.

E. Drive Device & Energy Source

The energy source of the drive unit is preferably hydraulic, electric, pneumatic or manual. The drive unit further comprising a drive element which may be by a rotor axle means having a sprocket for driving the transfer element or a cog for driving a belt, either of which mounted on a rotary axle. As described above, the drive unit may alternatively comprise a pressure accumulator using compressed air or gas, valved chamber system wherein vacuum pressure creates directed force similar to a human heart valve system.

F. Control Unit & Sensors

A control unit may further communicate with the device to direct movement of the contained weights. Said control unit may comprise of electrical, digital, or manual method of controlling power and direction of movement. In the case of a digital means of control, electrical sensors may be set to read the position of the boom and the position of counterweight. Sensors may further comprise a combination of digital, electrical, magnetic means or any other known means that allow for either wired or remote ability to accurately sense and calculate location and load of weight in a meaningful real time manner. The sensors further react to digital control means by moving either the boom or counterweight towards a designated location and direction according to parameters designated at the control unit. Designation of movement at the control unit may be by live operator choice or by predetermined automatic means. Said sensors comprising but not limited to a vertical sensor, a horizontal sensor and a tilt sensor to assess the coordinated and changing load position of the machine and its shifting center of gravity. For example, said control unit receives input from the vertical sensor of real time location of load and center of gravity to which an output designation is provided by the operator for a responding reaction and variable adjustment of counterweight or reinforcement weight. In the case of lifting movement where the boom is in an elevated position, the control unit powers and directs the drive unit to move the counterweight to a designated location to the rear of the vehicle according to an algorithm that coordinates counterweight. In the case of downward pushing movement, for example a drill or jackhammer, the counterweight is directed to the front of the vehicle according to algorithmic calculations that coordinate reinforcement weight. Distribution of counterweight may also be manually adjusted by an operator, particularly useful as an emergency safety system in case of system failure.

These and additional object, advantages, features and benefits of the present invention will become apparent from the following specification.

Having fully described at least one embodiment of the present invention, other equivalent or alternative methods according to the present invention will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

The invention claimed is:

1. An extendable skid-steer vehicle arm device comprising
   a skid-steer vehicle having a front side and a rear side,
   said skid-steer vehicle having a right side and a left side,
   said skid-steer vehicle having a top side and bottom side,
   a cab feature located at the top front end of said skid-steer vehicle,
   said cab feature having a front window,
   said cab feature having at least one doorway access on its either left or right sides or both left and right sides for user ingress and egress,
   said cab feature having a floor surface for the user to stand or sit on within said cab feature,
   said floor surface of said cab feature is positioned horizontally parallel to and above the ground surface,
   the floor level of said skid-steer vehicle comprising the horizontal plane in which the floor surface is located on said skid-steer vehicle,
   said skid-steer vehicle further having a Z-shaped arm unit,
   said Z-shaped arm unit comprising a first individual Z-shaped arm attached to a left side and a second Z-shaped individual arm attached to a right side of said skid-steer vehicle,
   each individual Z-shape arm having an upper horizontal linear piece and a lower horizontal linear piece wherein said upper and lower horizontal pieces are parallel to each other,
   each said upper and lower horizontal piece having a distal end and a proximal end,
   the distal end of each upper and lower horizontal piece is located at the rearward side of said skid-steer vehicle,
   said rearward side of said skid-steer vehicle is located rearward away from the cab feature,
   the proximal end of said upper horizontal piece and the distal end of said lower horizontal piece are connected by a linear angular piece wherein said distal end of said lower horizontal piece is positioned beyond the proximal end of said upper horizontal piece in the direction towards the distal end of said upper horizontal piece, forming a Z-shaped arm element,
   said distal end of each said upper horizontal linear piece is rotatably attached to the external surface at the rear left and right sides of said skid-steer vehicle.

2. Said extendable skid-steer arm device of claim 1 wherein an extendable linear hydraulic element is attached in a bisecting manner on the rearward side of said extendable skid-steer arm device such that when said extendable linear hydraulic element is extended, said Z-shaped arm is pushed forward in an angular upward direction.

3. An extendable skid-steer vehicle arm system comprising an extendable skid-steer vehicle arm device according to claim 1 wherein said extendable skid-steer arm device is in synchronous communication with a variable counterweight device attached to the bottom of said skid steer vehicle such that when said extendable skid-steer arm device is moved forward and upward above the cab feature of said skid-steer vehicle, said variable counter-weights device will counterbalance said movement to create a stable and even center of gravity.

4. Said extendable skid-steer arm device of claim 1 wherein an extendable linear hydraulic element is attached in a bisecting manner to said linear angular piece on the rearward side of each said Z-shaped arm element, such that when said extendable linear hydraulic element of each Z-shaped arms is extended, each said Z-shaped arms is pushed forward in an angular upward direction.

* * * * *